(12) United States Patent
Chen et al.

(10) Patent No.: US 8,610,431 B2
(45) Date of Patent: Dec. 17, 2013

(54) NMR CONTRAST LOGGING

(75) Inventors: Songhua Chen, Katy, TX (US); Daniel Georgi, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 326 days.

(21) Appl. No.: 13/012,929

(22) Filed: Jan. 25, 2011

(65) Prior Publication Data

US 2011/0181278 A1 Jul. 28, 2011

Related U.S. Application Data

(60) Provisional application No. 61/299,029, filed on Jan. 28, 2010.

(51) Int. Cl.
*G01V 3/00* (2006.01)
(52) U.S. Cl.
USPC .......................................... 324/303; 324/306
(58) Field of Classification Search
USPC .......................................... 324/303, 306, 309
See application file for complete search history.

(56) References Cited

U.S. PATENT DOCUMENTS

| | | | |
|---|---|---|---|
| 4,615,879 A | | 10/1986 | Runge et al. |
| 4,639,365 A | | 1/1987 | Sherry |
| 4,710,713 A | * | 12/1987 | Strikman .................. 324/303 |
| 4,728,892 A | * | 3/1988 | Vinegar et al. .............. 324/309 |
| 4,783,535 A | | 11/1988 | Lo et al. |
| 4,983,376 A | | 1/1991 | Sherry |
| 5,064,636 A | | 11/1991 | Li et al. |
| 5,496,535 A | | 3/1996 | Kirkland |
| 6,366,087 B1 | * | 4/2002 | Coates et al. ................. 324/303 |
| 6,589,506 B2 | | 7/2003 | Cremillieux et al. |
| 6,825,657 B2 | | 11/2004 | Kleinberg et al. |
| 6,825,658 B2 | * | 11/2004 | Coates et al. ................. 324/303 |
| 2003/0016012 A1 | | 1/2003 | Coates et al. |
| 2009/0219022 A1 | | 9/2009 | Carpenter et al. |

OTHER PUBLICATIONS

Notification of Transmittal of the International Search Report and the Written Opinion of the International Searching Authority, or the Declaration; PCT/US2011/022524; Aug. 31, 2011.
Bulte, Jeff and Dara Kraitchman. "Iron Oxide MR Contrast Agents for Molecular and Cellular Imaging." NMR Biomed. 2004, vol. 17, pp. 484-499.
Morriss et al. "Reliable Nuclear Magnetism Logging—With Examples in Effective Porosity and Residual Oil Saturation." Society of Petrophysicists & Well Log Analysts 28th Annual Logging Symposium, 1987. [Introduction Only].

(Continued)

*Primary Examiner* — Louis Arana
(74) *Attorney, Agent, or Firm* — Cantor Colburn LLP (57) ABSTRACT

An apparatus for estimating a property of an earth formation penetrated by a borehole, the apparatus includes: a carrier configured to be conveyed through the borehole; a nuclear magnetic resonance (NMR) instrument disposed at the carrier and configured to perform an NMR measurement on a volume sensitive to the NMR measurement; and a contrast agent disposed in the volume and comprising particles that form a suspension in a liquid, the suspension of particles being configured increase a magnetic field gradient of at least one earth formation material in the volume to change an NMR relaxation time constant of the at least one earth formation material; wherein the NMR measurement on the volume containing the at least one earth formation material and the contrast agent is used to estimate the property.

22 Claims, 4 Drawing Sheets

(56) References Cited

OTHER PUBLICATIONS

Engelman, Bob and Ron Cherry. "Downhole Laboratory Analysis of Reservoir Fluid Properties." Fuel, May 2003.

Horkowitz et al. "Residual Oil Saturation Measurements in Carbonates with Pulsed NMR Logs." The Log Analyst, Mar./Apr. 1997, pp. 73-83.

Jung, C.W. and P. Jacobs. "Physical and chemical properties of superparamagnetic iron oxide MR contrast agents: ferumoxides, ferumoxtran, ferumoxsil," Magn Reson Imaging, 1995, vol. 13, No. 5, pp. 661-674. [Abstract Only].

Morriss et al. "Hydrocarbon Saturation and Viscosity Estimation from NMR Logging in the Belridge Diatomite." The Log Analyst vol. 38, No. 2, Mar./Apr. 1997.

Shen et al. "Monocrystalline iron oxide nanocompounds (MION): physicochemical properties." Magn Reson Med. May 1993; 29 (5): 599-604. [Abstract Only].

Sjogren et al. "Crystal size and properties of superparamagnetic iron oxide (SPIO) particles." Magn Reson Imaging. 1997, vol. 15, No. 1, pp. 55-67. [Abstract Only].

Andrei Volkov, "Contrast Agents in Magnetic Resonance Imaging," 1997. [http://home.utah.edu/~av6a51/mri.htm].

* cited by examiner

NMR CONTRAST LOGGING

CROSS REFERENCE TO RELATED APPLICATIONS

This application claims the benefit of an earlier filing date from U.S. Provisional Application Ser. No. 61/299,029 filed Jan. 28, 2010, the entire disclosure of which is incorporated herein by reference.

BACKGROUND OF THE INVENTION

1. Field of the Invention

The invention disclosed herein relates to nuclear magnetic resonance measurements of earth formations penetrated by a borehole.

2. Description of the Related Art

Accurate and precise measurements of properties of materials are necessary for the efficient exploration and production of hydrocarbons. One measurement technique makes use of the unique nuclear magnetic resonance (NMR) characteristics that the materials possess.

NMR measurements are generally performed in a borehole penetrating earth formations that may contain reservoirs of the hydrocarbons. This technique is referred to as NMR well logging.

In NMR well logging, an NMR logging instrument (i.e., tool) is conveyed through the borehole by a wireline or drill string for logging-while-drilling applications (LWD). NMR measurements are performed at various depths to produce a log. Thus, a petro-physicist or log analyst reviewing the log can form an image of and quantify the various materials and rock properties downhole.

NMR instruments measure the abundance of a nucleus under investigation (such as a proton) in the NMR instrument's sensitive volume and the evolution of nuclear spins, such as relaxation and fluid molecule self-diffusion processes. In well logging applications, quantification of multiphase fluids (i.e., different fluids separated from each other) in a porous rock formation often depends on the contrast of one or more MMR properties of individual fluid phases saturating the porous rocks. These properties include, but are not limited to, proton density, longitudinal relaxation time $T_1$, transverse relaxation time $T_2$, and diffusivity. Thus, if the fluid property contrasts marginally or overlaps between the different fluid phases, discerning the different fluids becomes quite difficult if not impossible. For example, light hydrocarbons and water in large pores have comparable relaxation times and diffusivity and are therefore difficult to quantify and to discern from one another.

Therefore, what are needed are techniques used in NMR logging that can discern different materials from each other when the materials have comparable NMR properties.

BRIEF SUMMARY OF THE INVENTION

Disclosed is an apparatus for estimating a property of an earth formation penetrated by a borehole, the apparatus includes: a carrier configured to be conveyed through the borehole; a nuclear magnetic resonance (NMR) instrument disposed at the carrier and configured to perform an NMR measurement on a volume sensitive to the NMR measurement; and a contrast agent disposed in the volume and comprising particles that form a suspension in a liquid, the suspension of particles being configured increase a magnetic field gradient of at least one earth formation material in the volume to change an NMR relaxation time constant of the at least one earth formation material; wherein the NMR measurement on the volume containing the at least one earth formation material and the contrast agent is used to estimate the property.

Also disclosed is one example of a method for estimating a property of an earth formation penetrated by a borehole, the method includes: conveying a carrier through the borehole, a nuclear magnetic resonance (NMR) instrument being disposed at the carrier and configured to perform an NMR measurement on a volume sensitive to the NMR measurement; providing a contrast agent into the volume, the contrast agent comprising particles that form a suspension in a liquid, the suspension of particles being configured increase a magnetic field gradient of at least one earth formation material in the volume to change an NMR relaxation time constant of the at least one earth formation material; performing an NMR measurement on at least one earth formation material in the volume containing the contrast agent; and estimating the property from the performed NMR measurement.

Also disclosed is one example of a method for estimating vug-porosity of an earth formation penetrated by a borehole, the method includes: conveying a carrier through the borehole a first time, a nuclear magnetic resonance (NMR) instrument being disposed at the carrier and configured to perform an NMR measurement on a volume sensitive to the NMR measurement; performing a first NMR measurement on at least one earth formation material in the volume; conveying a carrier through the borehole a second time, a nuclear magnetic resonance (NMR) instrument being disposed at the carrier and configured to perform an NMR measurement on a volume sensitive to the NMR measurement; providing a contrast agent into the volume, the contrast agent being configured to change an NMR relaxation time constant of at least one material in the volume; performing a second NMR measurement on the at least one earth formation material in the volume containing the contrast agent; and estimating the vug-porosity using the first NMR measurement and the second NMR measurement.

Further disclosed is an apparatus for estimating a property of a fluid in an earth formation penetrated by a borehole, the apparatus includes: a carrier configured to be conveyed through the borehole; a fluid analyzer disposed at the carrier and configured to receive a sample of a fluid from the earth formation, the fluid analyzer having a nuclear magnetic resonance (NMR) instrument configured to perform an NMR measurement on the sample; and a contrast agent configured to be mixed with the sample to change the relaxation time of at least one material in the sample; wherein the NMR measurement is used to estimate the property.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Disclosed are exemplary embodiments of techniques for enhancing the contrast of nuclear magnetic resonance (NMR) measurements between at least two materials in an earth formation. The techniques, which include apparatus and method, call for using a contrast agent in the materials being measured. The contrast agent actively alters one or more of the intrinsic NMR fluid properties of one fluid phase to enhance the contrasts of NMR measurements between the different fluid phases. For convenience, the contrast agents are grouped into two categories or types.

Type 1: Aqueous solution doped with a paramagnetic agent such as Gd-EDTA (ethylenediaminetetraacetic acid), iron sulphate and $MnCl_2$ in chelated form to reduce the toxicity and reaction with other minerals to avoid precipitation. The solution is homogeneous and reduces both $T_1$ and $T_2$. One benefit of the reduction in $T_1$ is a resulting reduction of repetition time thereby increasing image quality from being able to increase the number of repetitions of the NMR measurements. Alternatively, logging time and associated cost can be saved by more quickly conducting the NMR logging. For example, the $T_1$ time constant for clean water has been reported to be very high in some carbonate reservoirs, therefore requiring a very long wait time to repeat the NMR experiments or measurements. Type 1 contrast agents are considered as positive agents in that the agent itself contributes to the measured NMR signal. Positive agents contribute to the NMR signal because the aqueous solution contains protons, which produce the NMR signal.

Type 2: Immiscible negative agents such as ferrite particles. The particles are insoluble in water and form a suspension in the water. Negative contrast agents are considered not to contribute to the NMR signal because non-soluble paramagnetic particles are not in an aqueous solution containing protons. Type 2 agents in the form of nanoparticles create large surface areas having contact with the material or materials under investigation and, thus, can be more effective in reducing the relaxation times than larger particles. Superparamagnetic iron oxide-based colloids (SPIO) or ultrasmall paramagnetic iron oxides (USPIO) are compounds that have nonstoichiometric microcrystalline magnetite cores, which are coated with dextrans (in ferumoxide) or siloxanes (in ferumoxsil). SPIO agents can be more effective in reducing relaxation times than paramagnetic agents. Magnetite, a mixture of FeO and $Fe_2O_3$, is one type of iron oxide that can be used as a Type 2 contrast agent. In one embodiment, the FeO in magnetite can be replaced by $Fe_3O_4$. The suspension particles can generate a strong local magnetic field gradient, G. Because $T_2^*$ is inversely proportional to G, increasing G will reduce $T_2^*$ ($T_2^*$ being the observed free induction decay time constant), thus more effectively reducing the relaxation time. The reduced relaxation time will enhance the contrast of the NMR signals received from two types of fluids under investigation over the NMR signals that would be received if the contrast agent was absent. In lower concentrations of the Type 2 agent, both $T_1$ and $T_2$ are reduced proportionally. In higher concentrations of the Type 2 agent, the ratio of $(T_1/T_2^*)$ is increased because of local magnetic field inhomogeneities.

The contrast agent can be delivered by mixing the agent with drilling mud used during the process of drilling a borehole through an earth formation having one or more materials under investigation. This can be done for NMR LWD operations. In another embodiment, a fluid analyzer is disposed in the borehole. The fluid analyzer performs NMR measurements downhole on a sample of fluid extracted from the formation. In this embodiment, the contrast agent is added to the sample either in the analyzer or after the sample is extracted but before the sample enters the analyzer.

In addition to enhancing the contrast of NMR signals during one NMR experiment, more than one NMR experiment can be conducted both with and without the contrast agent. The NMR signals received with and without the contrast agent can be compared to determine more information about the earth formation.

Ferro- and paramagnetic contrast agents have unpaired electrons. The paramagnetic species range from simple substances such as molecular oxygen and stable radicals such as the nitroxide radical to metal ions (i.e., many transition metal ions). Table 1 lists several ions that can be used as contrast agents for NMR measurements.

TABLE 1

| Atomic Number | # of unpaired electrons in 3d shell | # of unpaired electrons in 4f shell | Ion | Magnetic moment (Bohr magneton) |
| --- | --- | --- | --- | --- |
| 24 | 3 | | Cr 3+ | 3.8 |
| 25 | 5 | | Mn 2+ | 5.9 (weak field) |
| 26 | 5 | | Fe 3+ | 5.9 (weak field) |
| 29 | 1 | | Cu 2+ | 1.7-2.2 |
| 63 | | 6 | Eu 3+ | 6.9 |
| 64 | | 7 | Gd 3+ | 7.9 |
| 66 | | 5 | Dy 3+ | 5.9 |

In order for a material to be useful as an NMR contrast agent, its electron spin-relaxation time must match the Larmor frequency of the nucleus under investigation. For protons, this condition is better achieved with the Fe3+, Mn2+, and Gd3+ ions (about 10E-8 to 10E-10 sec.). Gadolinoum has the highest number of unpaired electrons. However, for cost-effective consideration, Fe3+ and Mn2+ based contrast agents are more suitable for logging applications since it is likely that a large quantity of the contrast agent is needed to dope the drilling mud. This applies to both Type I and Type II agents.

For convenience, certain definitions are now presented. The term "NMR measurements" relates to spin-echo measurements, echo train measurements or other nuclear magnetic resonance measurements of nuclei in a material in the earth formation. In general, the nuclei are polarized by a static magnetic field. The nuclei are then "tipped" from their polarized positions by a pulse of electromagnetic energy, generally in the radio frequency (RF) range, and allowed to precess and relax towards their polarized positions. The nuclei emit electromagnetic energy referred to as "NMR signals" during their precession in relation to a characteristic of the earth formation. The NMR signals are measured and associated with the characteristic.

Various parameters may be selected for conducting the NMR measurements depending on a characteristic of interest in the earth formation. In addition, a sequence of the RF pulses known as Carr-Purcell-Meiboom-Gill (CPMG) measurement sequences may be used in the NMR measurements. Non-limiting examples of these parameters include wait time between individual CPMG echo train measurements, inter-echo spacing time (TE) for the CPMG sequences, magnitude of the static magnetic field, and frequency, magnitude, and duration of the RF magnetic field pulses.

Various parameters of the NMR signals may be measured to estimate a characteristic of the earth formation. Non-limiting examples of these parameters include longitudinal relaxation time constant ($T_1$), transverse relaxation time constant ($T_2$), and parameters related to these time constants.

Figure 1:
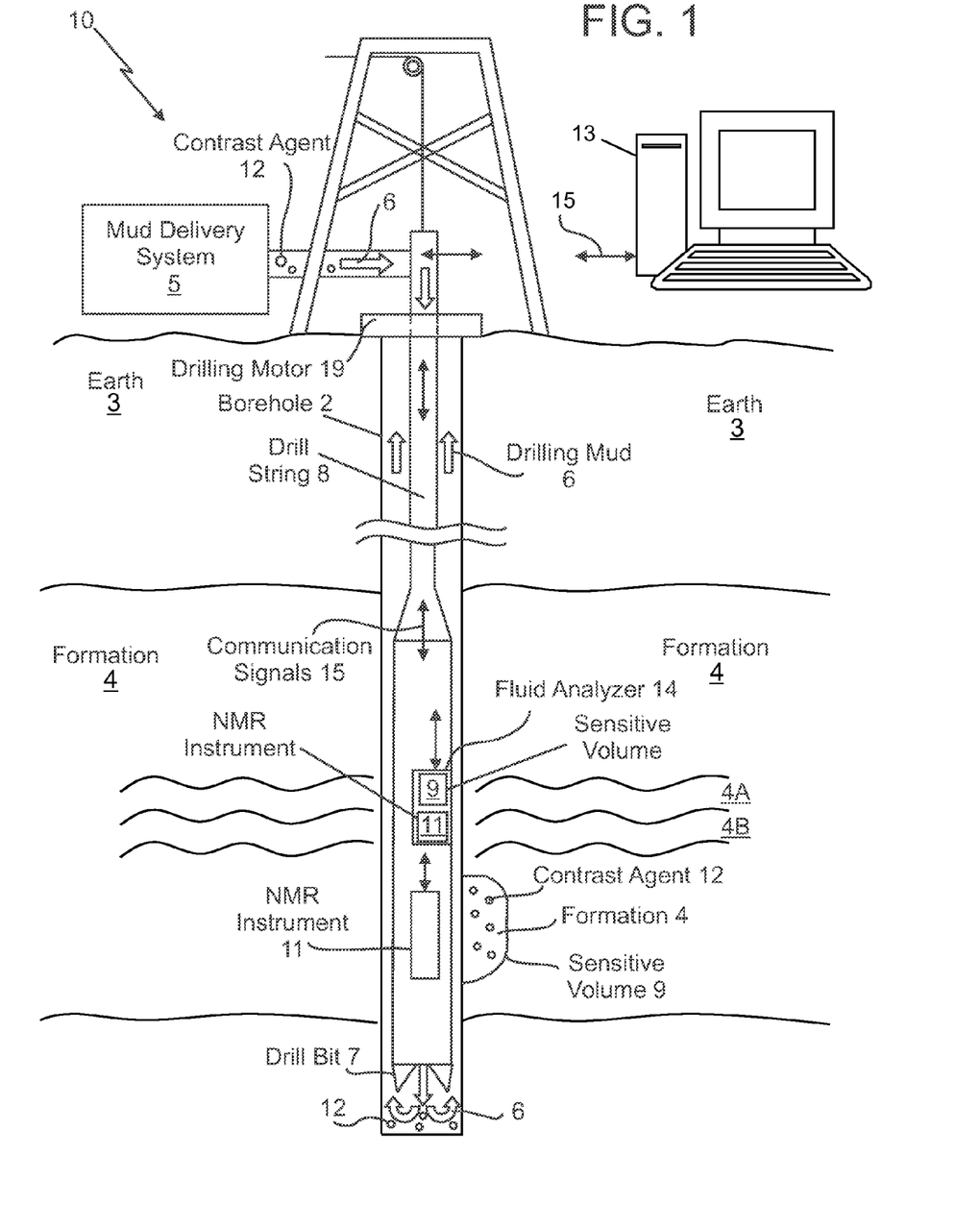
FIG. 1 illustrates an exemplary embodiment of a nuclear magnetic resonance (NMR) instrument disposed at a drill string in a borehole penetrating the earth.

Reference may now be had to FIG. 1. FIG. 1 illustrates a cross-sectional view of a drilling system 10 configured to perform NMR measurements on a volume of investigation 9 (also referred to as the sensitive volume 9). The drilling system 10 includes a drill string 8 having a drill bit 7 disposed at the distal end of the drill string 8. The drill string 8 is shown disposed in a borehole 2 penetrating the earth 3. A drilling motor 19 rotates the drill string 8 to turn the drill bit 7 for drilling the borehole 2. The earth 3 includes a formation 4, which can include layers 4A and 4B. The term "formation" can also include any materials of interest found downhole including materials disposed in the borehole 2. A drilling mud delivery system 5 is used to deliver drilling mud 6 through the drill string 8 to the drill bit 7 in order to cool and lubricate the drill bit 7. The drilling mud 6 exits the drill sting 8 at the drill bit 7, fills the borehole 2, and is recovered at the surface of the earth 3. The mud delivery system 5 includes such tanks, pumps, valves, instrumentation, controllers and piping necessary to deliver the required volume flow rate of the drilling mud 6.

Still referring to FIG. 1, an NMR instrument 11 is shown disposed at the drill string 8. In one embodiment, the NMR instrument 11 is disposed in a collar attached to the drill string 8. The NMR instrument 11 is configured to perform NMR measurements of the at least two materials in the volume of investigation 9 in the formation 4. For discussion purposes, the at least two materials are described as a first material and a second material. In order to increase the contrast between the NMR measurements of the first material and the second material, a contrast agent 12 is disposed in the sensitive volume 9.

Still referring to FIG. 1, in one embodiment, the contrast agent 12 is delivered to the sensitive volume 9 by the mud delivery system 5. In this embodiment, the contrast agent 12 is mixed with the drilling mud 6. As the drilling mud 6 exits the drill bit 7 and fills the borehole 2, the contrast agent 12 can enter the formation 4 by way of pores, fissures, or openings leading into the formation 4. As the contrast agent 12 enters the sensitive volume 9 of the formation 4, the contrast agent 12 is dispersed about or mixed with the first material and the second material.

Still referring to FIG. 1, in one embodiment, the NMR instrument 11 is included in a formation fluid analyzer 14 disposed at the drill string 8. Using a fluid extraction probe (not shown), the fluid analyzer 14 extracts a sample of fluid from the formation 4 for NMR analysis. In one embodiment, the sample is deposited in a sample chamber where the NMR analysis is performed. Accordingly, the sample chamber includes the volume of investigation 9 on which the NMR measurements are performed by the NMR instrument 11. In this embodiment, the contrast agent 12 is mixed with the formation fluid sample to increase the contrast in NMR signals emitted by at least two materials in the sample.

Still referring to FIG. 1, a computer processing system 13 is shown coupled to the NMR instrument 11 and the fluid analyzer 14. The processing system 13 is configured to transmit and receive communication signals 15 that can include command and control signals and data obtained by the NMR instrument 11 and the fluid analyzer 14. A telemetry system for communicating the signals 15 downhole can be pulsed-mud, wired pipe, optical, acoustic, or any technology known in the art.

Figure 2:
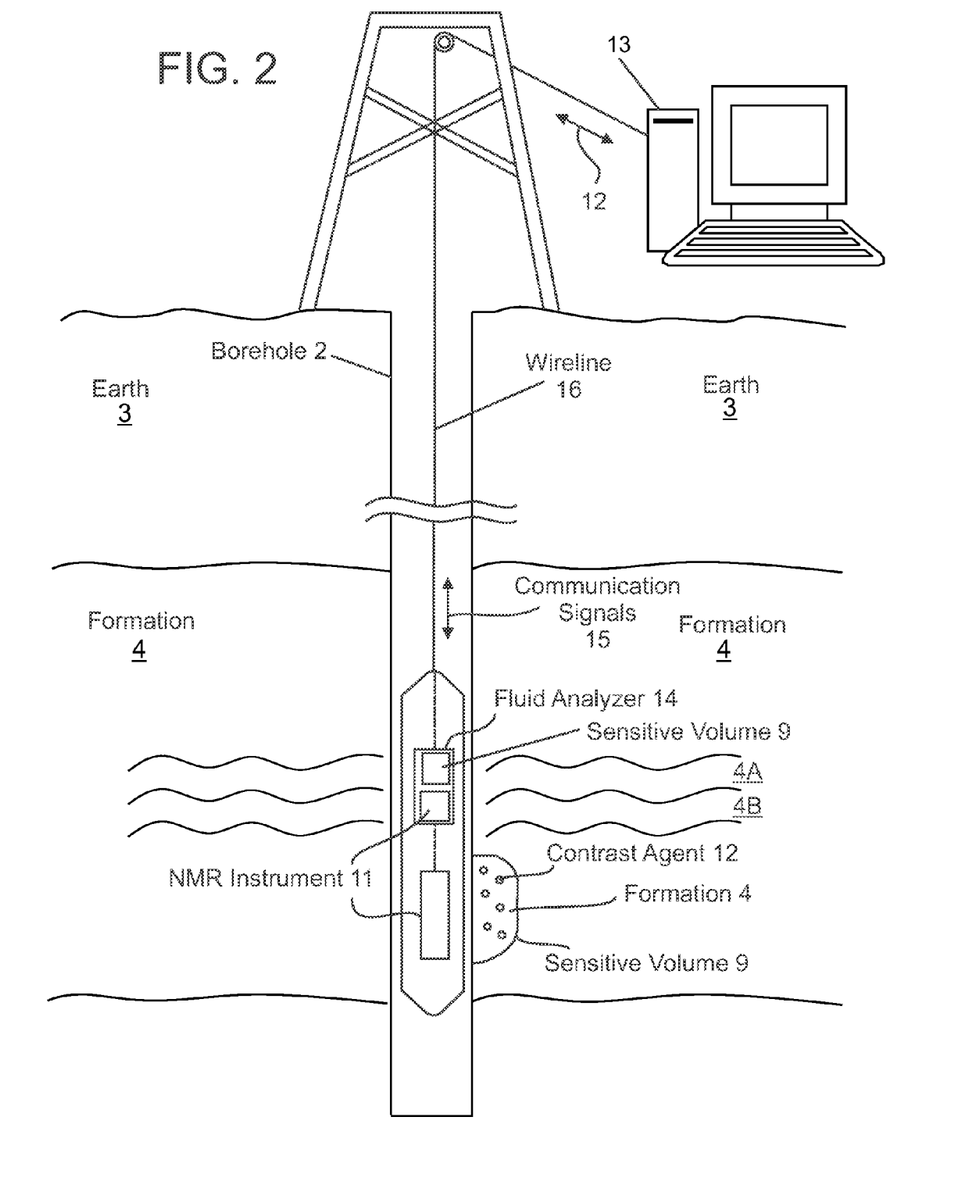
FIG. 2 illustrates an exemplary embodiment of the NMR instrument deployed in the borehole by a wireline.

Reference may now be had to FIG. 2 illustrating and exemplary embodiment of the NMR instrument 11 and the fluid analyzer 14 being deployed in the borehole 2 by a wireline 16. In addition to conveying the logging tool 11 and the fluid analyzer 14 through the borehole 2, the wireline 16 can also provide communications between these and other components downhole and topside equipment such as the computer processing system 13. In one embodiment, NMR measurements can be performed by the NMR instrument 11 disposed at the drill string 8 followed up by more NMR measurements with the NMR instrument 11 disposed by the wireline 16.

Figure 3:
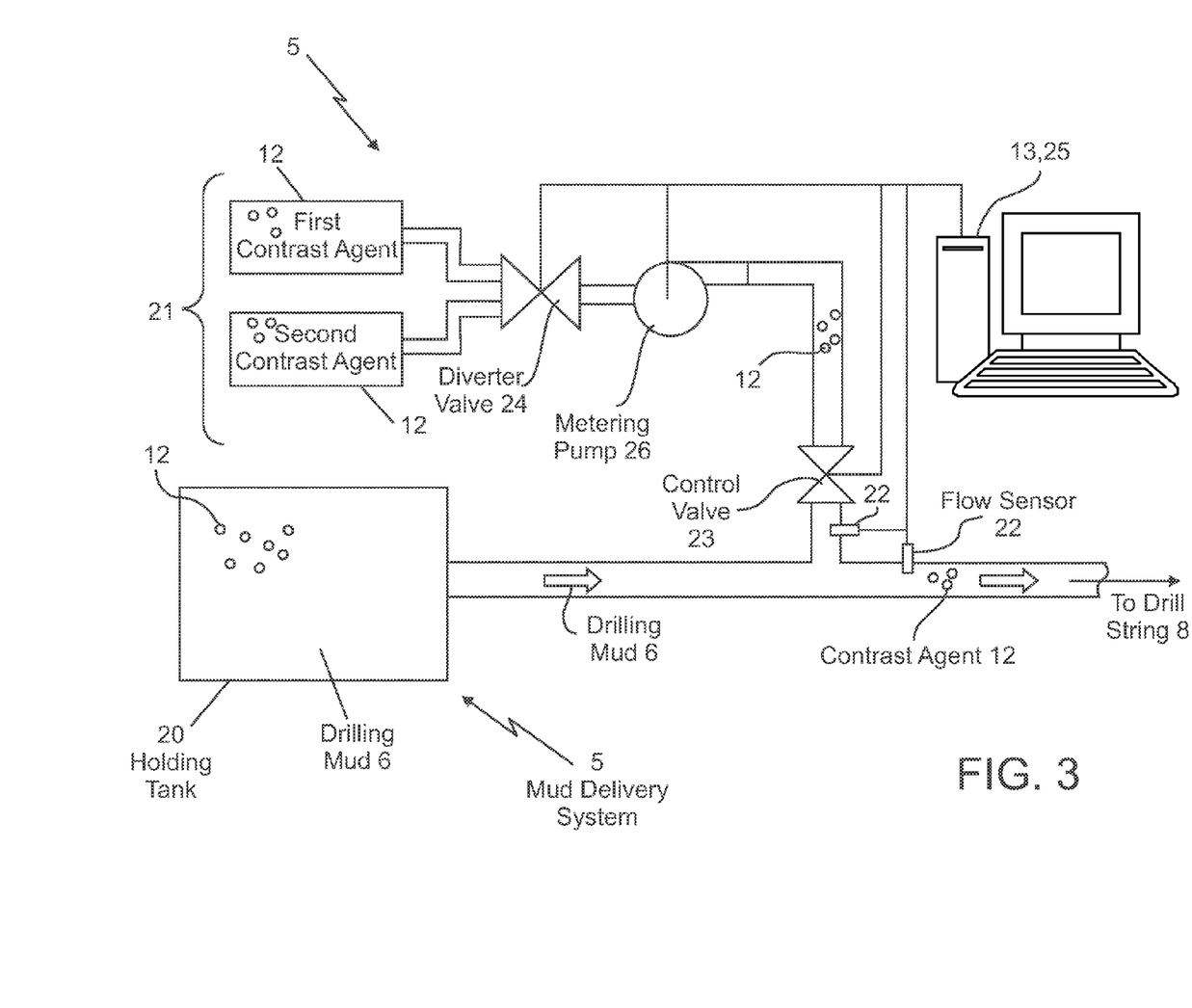
FIG. 3 depicts aspects of combining an NMR contrast agent with drilling mud at the surface of the earth.

Reference may now be had to FIG. 3. FIG. 3 depicts aspects of combining the contrast agent 12 with the drilling mud 6 at the surface of the earth 3. In one embodiment, the contrast agent 12 is batch mixed with the drilling mud 6 at a predefined ratio in a holding tank 20. In another embodiment, the contrast agent 12 is mixed with the drilling mud 6 using a metering system 21. The metering system 21 includes those components necessary to add the contrast agent 12 to the drilling mud 6 as the mud 6 is flowing into the drill string 8 to obtain a predefined ratio of agent 12 to mud 6. Non-limiting examples of these components include a flow sensor 22, which can be a mass-flow sensor, a metering pump 26, a control valve 23, a diverter valve 24 and a controller 25, which can be the computer processing system 13. The diverter valve 24 is used when at least two different contrast agents 12 are available for use. Hence, the computer processing system 13 using NMR measurements can determine a concentration and type of contrast agent to be used for the NMR logging and implement the selections using the metering system 21.

One application for using the contrast agent 12 in NMR logging is quantification of Vuggy and Non-Vuggy Porosities. Post-deposition digenesis of a carbonate rock formation involves a chemical process that results in dissolution pores and vugs. Some vugs are isolated, namely they are only connected through the formation matrix; some vugs are touching, which means they may be either directly connected to large throats or by fractures. Most prior art logging techniques have difficulty discerning touching vugs from isolated vugs. The determination of vug porosity and the connectivity is very important to estimate the recoverable potential and for permeability estimation.

The techniques disclosed herein call for using the drilling mud 6 doped with a Type I or Type II contrast agent 12 for determining vug porosity and vug connectivity. In general, two NMR logging passes through the borehole 2 are needed such as log-injection (of contrast agent 12)-log. The first pass uses regular, undoped drilling mud 6 to establish a baseline. Then, the drilling mud 6 is doped with the contrast agent 12 and a second pass is performed to relog over a depth range of interest. If all vugs are well connected, the contrast agent 12 should be able to reach the large pores (vugs). Thus, the $T_1$ and $T_2$ relaxation time constants of these vugs will be reduced substantially compared to the first, non-doped pass results. If the large pores are not connected, the relaxation times of the two passes corresponding to the large vugs are substantially the same. By analyzing the shift in relaxation time constants between the two passes, an analyst can quantify vuggy porosity. Accordingly, the analyst can select the correct permeability model (vuggy or non-vuggy permeability model) for estimation of permeability.

For LWD NMR logging, if the NMR logging tool 11 is sufficiently close behind the drill bit 7 such that no significant time elapses between the drilling and the NMR logging (i.e., invasion with the contrast agent 12 is zero or very small in the sensitive volume 9), the analyst can use the wire-drilling pass and the tripping pass to replace the log-injection-log process.

Furthermore, the particle size when using the Type II contrast agent 12 can be controlled so that the size corresponds to a threshold throat size through which it is desired for the suspension particle to pass through. The threshold pore size corresponds to the capillary pressure that the well is going to have in production.

Another application for using the contrast agent 12 in NMR logging is determining an invasion profile. No prior art well logging tools can unambiguously determine a near-wellbore invasion profile for at least the following reasons. For instance, water-based-mud-filtrate (WBMF) invades a water-bearing or residual oil-bearing formation, the invaded WBMF and the reservoir movable water are indistinguishable from each other. In general, if the invading filtrate and the flushed-away native fluids have similar NMR fluid properties, one cannot distinguish the invaded fluid from native saturated reservoir fluid. This is common in oil-based-mud (OBM) drilled wells if the oil-based-mud-filtrate (OBMF) and native oil have similar viscosity.

The techniques disclosed herein call for using drilling mud 6 doped with the contrast agent 12 such that the filtrate has characteristically different NMR fluid responses. For WBMF, either a Type I or Type II contrast agent 12 can be used, as long as the filtrate relaxation time constant is substantially or noticeably different from the relaxation time constant of the movable water.

For a well drilled with OBM, Type II ultrasmall particles can be used forming a paramagnetic particle suspension in the base oil. Nano-size particles are preferred to increase the efficiency of relaxation time reduction because of the amount of surface available for oil to contact and for the stability of particle suspension. Also, small suspension particle size ensures that the particles are free to pass through the rock pore throats. Furthermore, the particles may have an oil-wet coating to increase their stability as a suspension in oil.

A multi-frequency NMR tool 11, which varies the magnetic field gradient G monotonically, is used for acquiring multiple NMR measurements to determine the depth of invasion (DOI) profile. By varying the gradient G monotonically, the distance from the wall of the borehole 2 to the sensitive volume 9 can be varied. Analyzing individual DOI NMR responses and comparing the difference to other NMR responses provides a determination of the invasion profile with higher accuracy than without using the contrast agent 12.

When materials in two layers of the formation 4 have similar NMR characteristics, the contrast agent 12 can be used to differentiate between the materials and more accurately locate a boundary between the two layers.

Another application for using the contrast agent 12 in NMR logging is fluid typing when the NMR tool 11 produces a low magnetic field gradient G. Low magnetic-field-gradient NMR tools 11 have a disadvantage with diffusion based fluid typing. Diffusion based fluid typing requires a strong gradient G to obtain sufficiently large G*TE contrast for detecting the difference in diffusivity between water and hydrocarbon phases. A large TE can be chosen to partially compensate for a small G, but the ability of using a large TE is limited by the intrinsic relaxation time of pore-filling fluids and data quality considerations. The larger the TE, the fewer echoes are acquired during the echo train decay, resulting in poorer overall signal quality. Furthermore, TE cannot be increased to the same order of magnitude as the relaxation time; otherwise, the echoes will be decayed substantially including the first echo. Such a limitation makes it virtually useless to use a low magnetic field gradient NMR tool 11 for fluid typing.

Due to local magnetic field variation surrounding each particle of the contrast agent 12 in suspension, there is a large "internal gradient" in the immiscible suspension solution made with USPIO. If the suspension particles are in WBMF, and the WBMF is expected to be miscible to the native reservoir water, then the mixed water will show both the decrease of relaxation times and the existence of a large local internal magnetic field gradient in the water-filled pores. The large local internal gradient in the water phase fluid caused by the contrast agent 12 makes a multiple TE log for fluid typing feasible. For the multiple TE log, the internal gradient provides sufficient contrast for the water NMR $T_2^*$ time constant to shift as TE increases, while the oil is not affected by the local gradient so it will have no variation responding to the TE variation. This effect provides the basis for discerning between water and oil.

USPIO is one example of the contrast agent 12 that can achieve a large "internal gradient." It is recognized that other particles or molecules that produce similar effects can also be used.

Similarly, if the suspension is in OBMF, and since OBMF is miscible to the native oil, the mixed oil will respond to multiple TE variations but the water will not. Thus, NMR measurement with multiple TE can be used to separate oil and water measurements even if the NMR tool 11 generates a gradient G that is small or zero.

Another application for using the contrast agent 12 is in the downhole NMR fluid analyzer 14. Prior art downhole fluid analyzers have been used for analyzing reservoir fluids and for detecting mud filtrate contamination levels in order to obtain contamination-free sample collection. Since the NMR measurements take place in vitro (i.e., outside of the formation 4), the bulk fluid NMR properties are expected to be obtained by the downhole fluid analyzers. The capability of discerning different fluid types in the bulk fluid relies on each fluid type having an NMR property that contrasts with the NMR property of the other fluid types. Also, since bulk water has a long relaxation time constant, it often requires a very long wait time, which limits the number of samples that can be analyzed in a given time.

Figure 4:
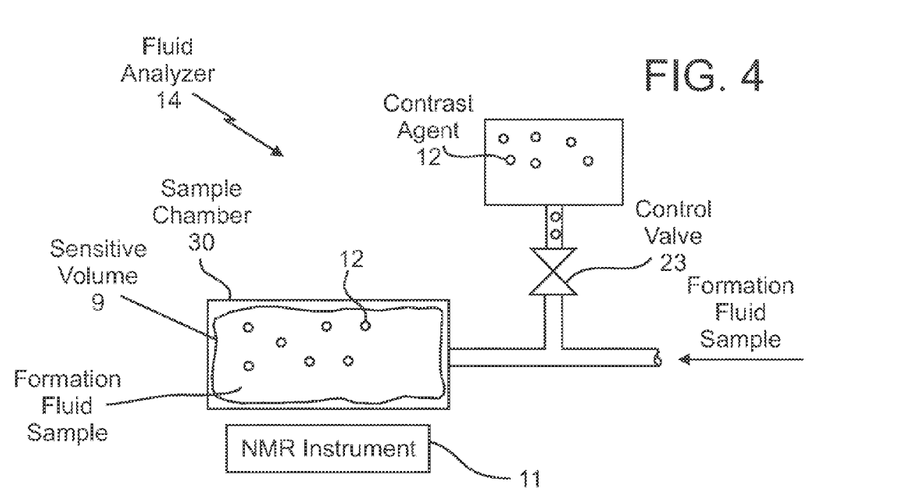
FIG. 4 depicts aspects of combining the NMR contrast agent with a formation fluid sample for analysis by a downhole NMR fluid analyzer.

The techniques disclosed herein call for injecting a small amount of high-concentration Type I aqueous solution or Type II aqueous USPIO suspension (i.e., contrast agent 12) to be mixed with the pumped-in reservoir fluid sample at the inlet of a sample chamber 30 as shown in FIG. 4.

The first benefit of mixing the contrast agent 12 with the reservoir fluid sample is that the wait time is no longer controlled by the long relaxation time constant of bulk water, which can be greater than five seconds in high temperatures. A greater time-saving benefit can be realized for viscose oil reservoirs, which have short relaxation time constants, thus providing much shorter wait times.

The second benefit is more accurate fluid typing and quantification. For light hydrocarbons, the long relaxation constant of light hydrocarbons often makes it difficult to completely separate the light hydrocarbons from bulk water. Without using the contrast agent 12, multiple types of NMR measurements with different parameter settings are required, which is time consuming and limited by the intrinsic NMR contrast of the different fluids. By reducing the water phase relaxation time substantially, fewer measurements are needed to accurately separate oil and water NMR signals. Not only fewer but simpler NMR measurement types can accomplish fluid quantification since no magnetic field gradient apparatus is needed and, hence, the NMR instrument 11 can be simpler that prior art NMR instruments.

The third benefit is estimation of contamination is more accurate than with prior art methods. The total volume of the sample chamber 30 and the amount of injected contrast agent 12 solution are two known quantities. For WBMF at an oil-bearing depth, the contamination level can be determined by both the amount of mixed water and the relaxation time constant of the mixed water. Because the ion concentration is proportional to the change in relaxation time constants and the original concentration of the contrast agent 12 is known, the amount of water can be computed from the change in relaxation time constants of the mixed water phase. The computed amount of water used with a direct water proton intensity measurement provides a more accurate estimate of the contamination.

Figure 5:
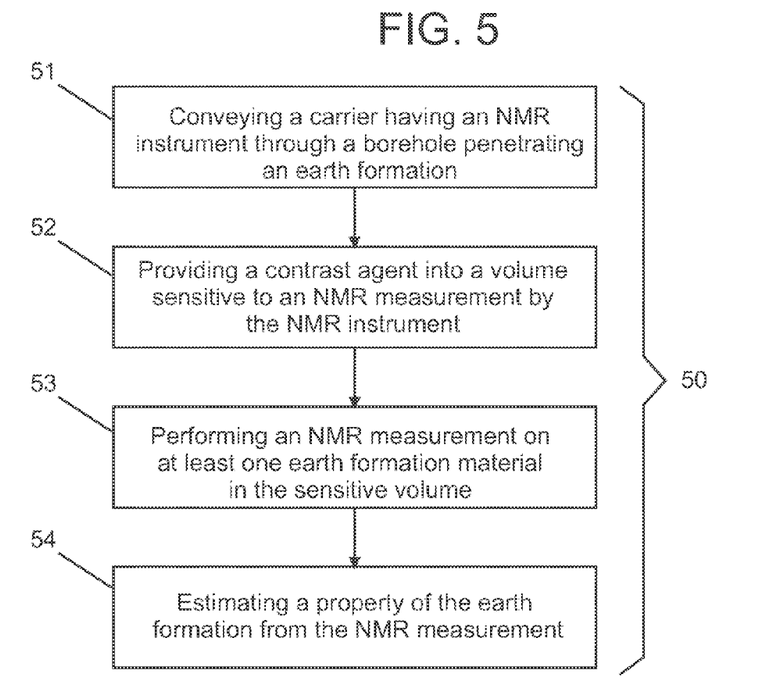
FIG. 5 presents one example of a method for estimating a property of an earth formation penetrated by the borehole.

FIG. 5 presents one example of a method 50 for estimating a property of an earth formation penetrated by the borehole 2. The method 50 calls for (step 51) conveying a carrier (i.e., the drill string 8) having the NMR instrument 11 through the borehole 2. The NMR instrument 11 is configured to perform an NMR measurement on a volume sensitive to the NMR measurement. Further, the method 50 calls for (step 52) providing the contrast agent 12 into the sensitive volume. The contrast agent 12 includes particles that can be suspended in a fluid to increase a local magnetic field gradient of at least one earth formation material in the volume. Further, the method 50 calls for (step 53) performing an NMR measurement on the at least one earth formation material in the sensitive volume. Further, the method 50 calls for (step 54) estimating the property from the NMR measurement.

In support of the teachings herein, various analysis components may be used, including a digital and/or an analog system. For example, the NMR instrument 11, the computer system 13, the controller 25, or the downhole fluid analyzer 14 can include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a sample line, sample storage, sample chamber, sample exhaust, pump, piston, power supply (e.g., at least one of a generator, a remote supply and a battery), cooling component, heating component, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The drill string 8 and the wireline 15 are non-limiting examples of a carrier.

Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to two devices being directly coupled or indirectly coupled using an intermediate device.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property of an earth formation penetrated by a borehole, the apparatus comprising:
   a carrier configured to be conveyed through the borehole;
   a nuclear magnetic resonance (NMR) instrument disposed at the carrier and configured to perform an NMR measurement on a volume sensitive to the NMR measurement; and
   a contrast agent disposed in the volume and comprising particles that form a suspension in a liquid, the suspension of particles being configured increase a magnetic field gradient of at least one earth formation material in the volume to change an NMR relaxation time constant of the at least one earth formation material;
   wherein the NMR measurement on the volume containing the at least one earth formation material and the contrast agent is used to estimate the property.

2. The apparatus of claim 1, wherein the volume in located in the earth formation.

3. The apparatus of claim 2, further comprising a drilling mud delivery system configured to deliver drilling mud and the contrast agent to the volume in the earth formation.

4. The apparatus of claim 3, further comprising a contrast agent metering system configured to meter the contrast agent to the drilling mud at a selected ratio of contrast agent to drilling mud.

5. The apparatus of claim 4, wherein the contrast agent metering system is configured to select from at least a first contrast agent and a second contrast agent to be metered to the drilling mud.

6. The apparatus of claim 4, wherein the contrast agent metering system comprises at least one of a flow sensor, a metering pump, a control valve, and a controller, each configured to meter the contrast agent at the selected ratio.

7. The apparatus of claim 1, further comprising a fluid analyzer disposed at the carrier in the borehole and configured to receive a sample of fluid from the earth formation in a sample chamber that includes the volume sensitive to the NMR measurement.

8. The apparatus of claim 7, wherein the fluid analyzer comprises a contrast agent metering system configured to meter the contrast agent to the sample at a selected ratio of contrast agent to sample.

9. The apparatus of claim 1, wherein the relaxation time constant change comprises a reduction in the relaxation time constant.

10. The apparatus of claim 1, wherein the particles comprise a chemical having at least one unpaired electron in an orbital shell.

11. The apparatus of claim 10, wherein the chemical comprises at least one of $Cr^{3+}$, $Mn^{2+}$, $Fe^{3+}$, $Cu^{2+}$, $Eu^{3+}$, $Gd^{3+}$, and $Dy^{3+}$.

12. The apparatus of claim 10, wherein the chemical comprises at least one of superparamagnetic iron oxide-based colloids (SPIO) or ultrasmall paramagnetic iron oxides (USPIO).

13. The apparatus of claim 1, wherein the particles comprise nanoparticles.

14. The apparatus of claim 1, wherein the property is at least one of porosity, permeability, invasion profile, fluid composition, and a location of a boundary between layers of the formation.

15. A method for estimating a property of an earth formation penetrated by a borehole, the method comprising:
conveying a carrier through the borehole, a nuclear magnetic resonance (NMR) instrument being disposed at the carrier and configured to perform an NMR measurement on a volume sensitive to the NMR measurement;
providing a contrast agent into the volume, the contrast agent comprising particles that form a suspension in a liquid, the suspension of particles being configured increase a magnetic field gradient of at least one earth formation material in the volume to change an NMR relaxation time constant of the at least one earth formation material;
performing an NMR measurement on at least one earth formation material in the volume containing the contrast agent; and
estimating the property from the performed NMR measurement.

16. The method of claim 15, further comprising performing another NMR measurement on the at least one earth formation material in the volume not having the contrast agent and estimating the property from the NMR measurement and the another NMR measurement.

17. The method of claim 15, wherein the volume sensitive to the NMR measurement is in a sample chamber disposed in a fluid analyzer comprising the NMR instrument.

18. A method for estimating vug-porosity of an earth formation penetrated by a borehole, the method comprising:
conveying a carrier through the borehole a first time, a nuclear magnetic resonance (NMR) instrument being disposed at the carrier and configured to perform an NMR measurement on a volume sensitive to the NMR measurement;
performing a first NMR measurement on at least one earth formation material in the volume;
conveying a carrier through the borehole a second time, a nuclear magnetic resonance (NMR) instrument being disposed at the carrier and configured to perform an NMR measurement on a volume sensitive to the NMR measurement;
providing a contrast agent into the volume, the contrast agent being configured to change an NMR relaxation time constant of at least one material in the volume;
performing a second NMR measurement on the at least one earth formation material in the volume containing the contrast agent; and
estimating the vug-porosity using the first NMR measurement and the second NMR measurement.

19. The method of claim 18, wherein the contrast agent comprises at least one of an aqueous solution comprising a paramagnetic agent and particles that form a suspension in a liquid, the suspension of particles being configured increase a magnetic field gradient of the at least one earth formation material in the volume.

20. The method of claim 19, wherein the paramagnetic agent comprises at least one of Gd-EDTA, iron sulphate and $MnCl_2$.

21. An apparatus for estimating a property of a fluid in an earth formation penetrated by a borehole, the apparatus comprising:
a carrier configured to be conveyed through the borehole;
a fluid analyzer disposed at the carrier and configured to receive a sample of a fluid from the earth formation, the fluid analyzer comprising a nuclear magnetic resonance (NMR) instrument configured to perform an NMR measurement on the sample; and
a contrast agent configured to be mixed with the sample to change the relaxation time of at least one material in the sample;
wherein the NMR measurement is used to estimate the property.

22. The apparatus of claim 21, wherein the contrast agent comprises at least one of an aqueous solution comprising a paramagnetic agent and particles that form a suspension in a liquid, the suspension of particles being configured increase a magnetic field gradient of the at least one material in the sample.

* * * * *